Sept. 4, 1956           D. JOHNSTON           2,761,391
METERING PUMP FOR PRESSURIZED NORMALLY-GASEOUS LIQUIDS
Filed Sept. 26, 1951           2 Sheets-Sheet 1
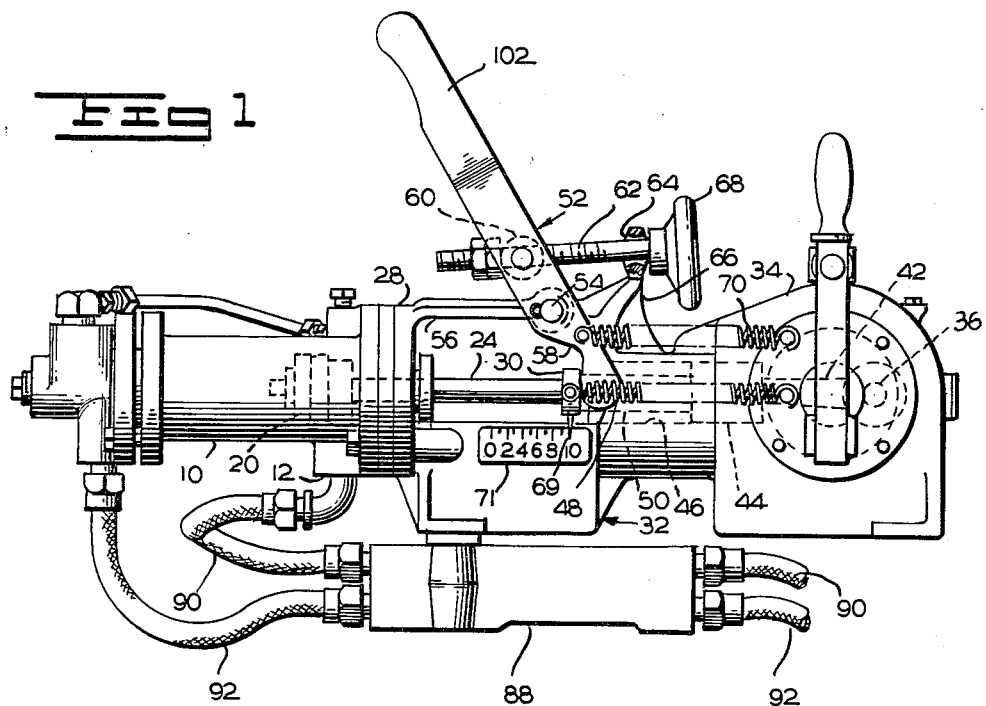
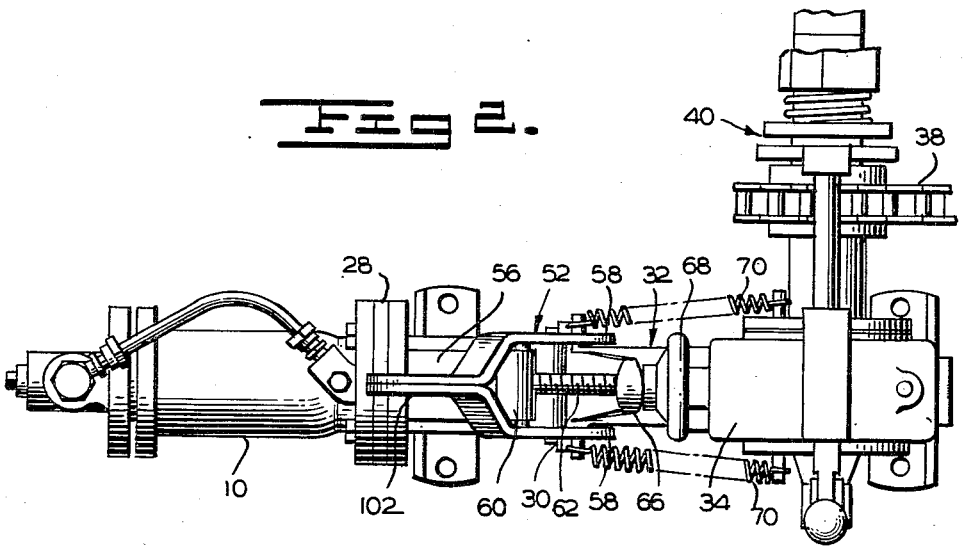
INVENTOR
DOUGLAS JOHNSTON
BY Cushman, Darby & Cushman
ATTORNEY Sept. 4, 1956  D. JOHNSTON  2,761,391
METERING PUMP FOR PRESSURIZED NORMALLY-GASEOUS LIQUIDS
Filed Sept. 26, 1951  2 Sheets-Sheet 2
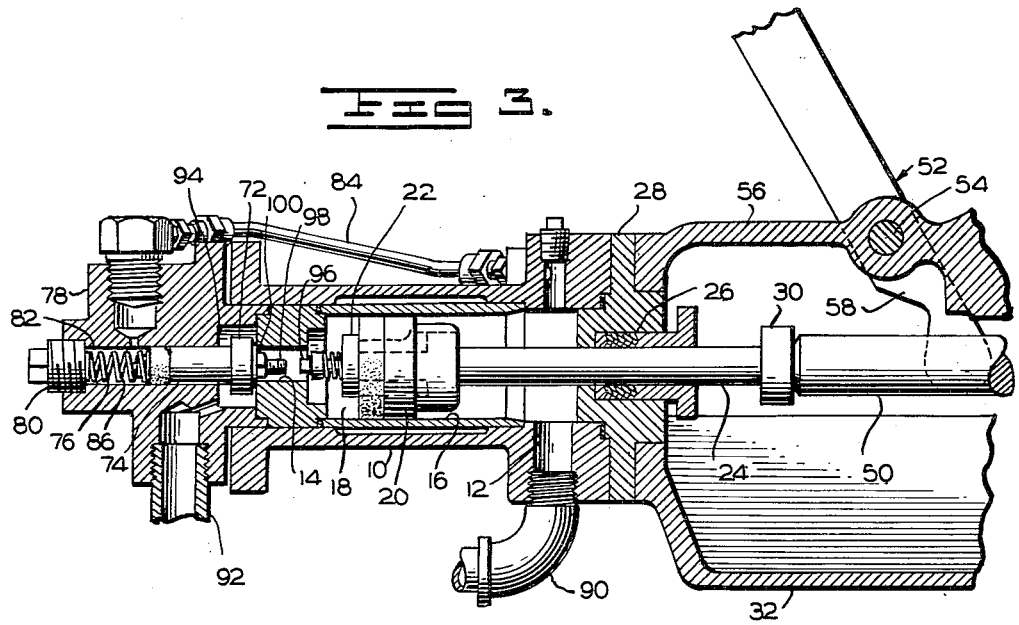
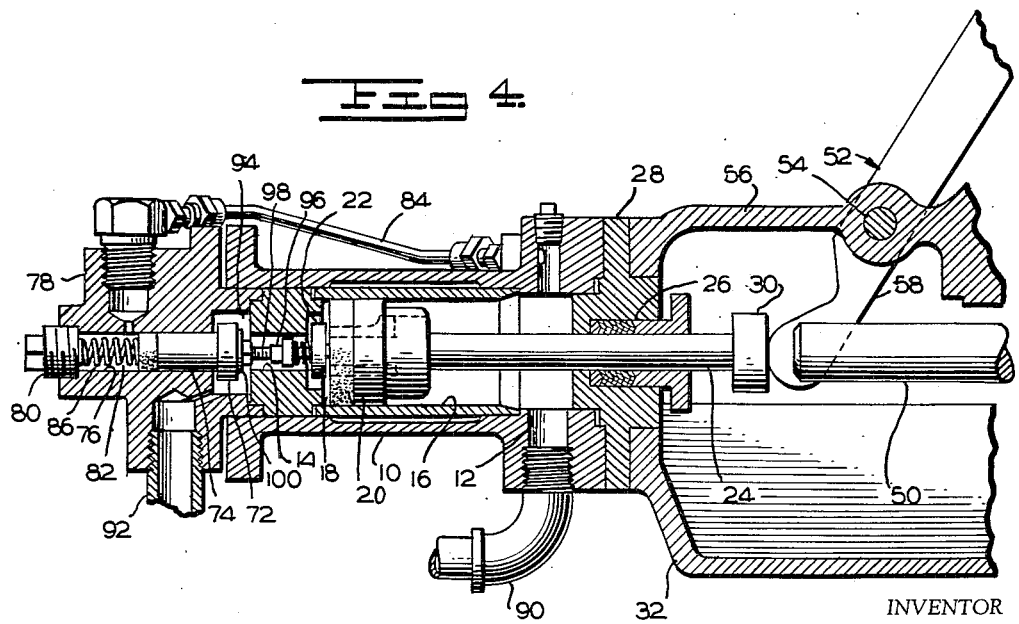
INVENTOR
DOUGLAS JOHNSTON
BY *Cushman, Darby & Cushman*
ATTORNEY

United States Patent Office 2,761,391
Patented Sept. 4, 1956

2,761,391

METERING PUMP FOR PRESSURIZED NORMALLY-GASEOUS LIQUIDS

Douglas Johnston, Huntsville, Ala., assignor to John Blue Company, Huntsville, Ala., a corporation of Alabama Application September 26, 1951, Serial No. 248,407

5 Claims. (Cl. 103—38)

The present invention relates to apparatus for accurately metering a pressurized normally-gaseous liquid, and, more particularly, to an improvement in the pump for such purpose shown in the copending application of John Blue, Serial No. 80,957, filed March 11, 1949, now Patent No. 2,696,785, issued December 14, 1954.

The apparatus disclosed in the aforementioned application is used to accurately meter anhydrous ammonia during application thereof as a fertilizer beneath the surface of the ground. Such apparatus consists of a reciprocating piston pump which is mounted on a tractor and chain driven from the main axle thereof to transfer anhydrous ammonia from a high pressure storage tank, also carried on the vehicle, to a plurality of ground-working plows or applicator blades. The pump cylinder has an inlet and an outlet, each controlled by a check valve. For the purpose of preventing the high pressure anhydrous ammonia from blowing straight through the pump and also for the purpose of compensating for variations in storage tank pressure, caused by temperature fluctuations, changes in liquid level in the tank and other reasons, the outlet check valve is loaded by the pressure of the anhydrous ammonia in the storage tank.

Accurate metering of anhydrous ammonia is difficult because upon flow from a high pressure storage tank gas bubbles form therein, and a mixture of gas and liquid of unknown proportions cannot be accurately metered. Therefore, in order to assure that only liquid anhydrous ammonia is supplied to the pump, the apparatus disclosed in the aforementioned patent also includes a heat exchanger for passing the discharge from the pump in heat exchange relation with the supply of fluid to the pump. The pressure drop of the anhydrous ammonia upon discharge from the pump causes it to expand with resulting cooling or refrigerating effect, so that the cold discharge from the pump effectively cools the anhydrous ammonia supplied to the pump. Such cooling of the supply serves to condense any gas bubbles which may have formed therein, and thus assures that anhydrous ammonia is supplied to the pump only in a liquid state.

At the beginning of a pumping or metering operation the cylinder of the pump and the supply line leading thereto are usually filled with a mixture of air and gaseous anhydrous ammonia. Additionally, the heat exchanger normally is warm. Hence, in order to obtain accurate metering of anhydrous ammonia to the ground-working applicators at the start of an operation, the entire system must be purged of the mixture of air and gaseous ammonia and also the refrigerating effect must be instigated in order to assure the supply of only a liquid to the pump.

For this purpose, the pump shown in the aforementioned copending application is provided with a passageway, controlled by a manually operable valve, which leads from the pumping chamber to the discharge side of the outlet check valve, in effect by-passing the latter. Before the start of a pumping operation, the aforementioned valve is opened to permit anhydrous ammonia from the storage tank to blow directly through the entire system and escape from the applicators. This operation completely purges the system of air and gaseous ammonia and also serves to produce a cooling effect in the heat exchanger so that after the latter has become sufficiently cold, only liquid is supplied to the pumping chamber. Thereupon, the tractor may be driven down a field and anhydrous ammonia applied to the ground in accurately metered quantities from the very beginning of the operation.

The above-described metering pump, while extremely satisfactory in practical operation, nevertheless is susceptible to improvements. More particularly, the pump-purging passageway and the valve controlling the same are a possible point of leakage from the system and also require additional materials and labor in the manufacture of the pump.

Hence, it is an object of this invention to eliminate from a pump of the type described, the purging passageway and valve controlling the same, and provide manually operable means for unseating the outlet check valve of the pump chamber in order to purge the pump and associated supply and discharge lines.

It is another object of this invention to provide improved means for purging a pump of the type under consideration.

Other objects and advantages of this invention will be evident from the following description and accompanying drawings, in which:

Figure 1 is an elevational view, partly in section, of a metering pump embodying this invention.

Figure 2 is a plan view of the pump shown in Figure 1.

Figure 3 is an enlarged fragmentary elevational sectional view of a portion of the pump shown in Figure 1, with the pump piston shown at the end of its pumping stroke.

Figure 4 is a view corresponding to Figure 3 showing the position of the movable pump parts for purging the pump and associated supply and discharge lines.

Referring now to the drawings, there is shown in Figures 1 and 2 a pump of the type disclosed in the aforementioned copending application. The pump comprises a cylinder block 10 having a lateral inlet port 12, an end outlet port 14, and a liner 16 therein to form a pumping chamber 18. A ported piston 20 provided with a spring-pressed inlet check valve 22 is mounted for reciprocation within the chamber 18 and has a piston rod 24 which sealingly projects through a suitable stuffing box 26 in a closure plate 28 that is secured to a flanged end of the block 10. The outer end of the rod 24 is provided with a crossbeam 30. Bolted to the flanged end of the block 10, with the closure plate 28 therebetween is a unitary casting 32 having a crankcase portion 34. A crankshaft 36 adapted to be driven by a chain 38, through a suitable clutch 40, from the main driving axle of a tractor (not shown) is journalled in the crankcase 34, as best shown in Figure 2. A connecting rod 42 mounted on the crankshaft 36 effects reciprocation of a cross head 44 within a guideway 46 formed in a sidewall of the crankcase 34. A pair of springs 48 connected to the crossbeam 30 and to the sides of the casting 32 normally effect the outward or suction stroke of the piston 20, while contact of a pushrod 50, on the cross head 44, with the crossbeam 30 serves to effect the inward or pumping stroke of the piston.

The pumping stroke may be regulated, in order to regulate the quantity of anhydrous ammonia discharged by the pump, per unit of distance travelled by the tractor, by limiting the outward or suction stroke of the piston 20. Such limitation is afforded by means of a yoke-like lever 52 which is pivoted, by a pin 54, on a bridge member 56 of the casting 32 and has a pair of depending legs 58 which straddle the bridge member and are engageable by the crossbeam 30 on the piston rod 24. Pivotally mounted between and on the lever legs 58, above the pivot pin 54, is a nut 60 threaded onto an adjusting bolt 62. One end of this bolt 62 projects through an over-sized aperture 64 in an upstanding lug 66 on the casting 32, and is provided with a handle 68 in order to effect rotation thereof. Appropriate rotation of the adjustment bolt 62, by means of the handle 68, effects pivotal movement of the lever 52 in a direction to move its depending legs 58 toward the crossbeam 30 to thus limit the extent of outward movement of the piston 20. A pair of springs 70 are connected to the depending legs of the lever 52 and to the sides of the casting 32 to normally maintain the lever in its adjusted position. A pointer 69 on the crossbeam 30 cooperates with an indicia plate 71 to provide a relative indication, when the piston is at the end of its suction stroke, of the quantity of anhydrous ammonia discharged per stroke of the pump.

The pumping chamber outlet port 14 is normally closed by a check valve 72 having a plunger portion 74 which is slidably mounted in a complementary bore 76 in a valve casing 78 bolted to the corresponding flanged end of the cylinder block 10. The outer end of the bore 76 is closed by a plug 80 to form a pressure chamber 82. A conduit 84 connects the pumping cylinder, on the inlet side of the piston 20, with the pressure chamber 82. Preferably, the diameters of the bore 76 and plunger 74 are substantially equal to that of the outlet port 14 for reasons later explained. The outlet check valve 72 is also preferably spring-biased to closed position by a relatively light spring 86 interposed between the plunger 74 and the plug 80. A heat exchanger 88, for purposes previously described, is interposed in the supply line 90 connected to the inlet port 12 and in the discharge line 92 connected to the discharge chamber 94 in the valve casing 78 to effect heat exchange between the discharge and supply of the pump.

The structure thus far described is substantially the same as that disclosed in the aforementioned copending application, and it will be seen that the outlet check valve 72 is loaded by the pressure of the fluid supplied to the pump, but that such valve will be unseated for discharge of liquid from the pumping chamber 18 by the pressure stroke of the piston 20. It also will be seen that the high pressure of the supply fluid acts on the cross-sectional area of the piston rod 24 to normally urge the piston 20 toward its fully retracted position, i. e., at the end of the suction stroke, so that the retracting springs 48 are not absolutely essential.

The piston rod 24, pushrod 50, and throw of the crankshaft 36 are so proportioned that at the end of the inward or pumping stroke of the piston 20 some clearance exists between the piston and the outlet end wall of the pumping chamber 18, and also a clearance exists between the stud 96 on which the inlet check valve 22 is mounted and the long stud 98 on which the valve washer 100 of the outlet check valve 72 is mounted. Hence, it will be seen that if the piston 20 over-travels at the end of the pumping stroke the stud 96 will engage the stud 98 and force the outlet check valve 72 off of its seat. This unseating of the outlet check valve 72 will, of course, effect a purging of both the pump and the supply and discharge lines 90 and 92 connected thereto.

Such over-travel of the piston 20 is accomplished by means of a handle extension 102 of the stroke adjusting lever 52. When this lever 52 is swung clockwise about its pivot 54, as permitted by the sliding of the bolt 62 through the over-sized aperture 64 in the upstanding lug 66, the piston rod 24 may be forced inwardly an extent sufficient to effect the aforementioned over-travel of the piston, and thereby accomplish the desired purging effect.

In addition to the above-mentioned purging effect, unseating of the outlet check valve 72 occasionally is desirable for another reason. Although a strainer (not shown) is normally incorporated in the supply line 90 to the pump, occasionally dirt and debris in the supply will pass through the screen and the inlet valve 22 of the piston 20 and lodge between the outlet check valve 72 and its seat. Thereupon the outlet check valve 72 will fail to seat properly and result in a continuous escape of fluid from the applicators (not shown). This difficulty usually may be cured by unseating the outlet check valve 72 by the above-described piston over-travel procedure, to permit fluid to flow directly through the outlet check valve and thereby blow out any such dirt or debris.

It will thus be seen that the objects of this invention have been fully and effectively accomplished. It will be realized, however, that various changes may be made in the specific embodiment used to illustrate this invention without departing from the principles thereof. Therefore, this invention includes all modifications which are encompassed by the spirit and scope of the following claims.

I claim:

1. A pump for accurately metering a pressurized normally-gaseous liquid comprising: means defining an expansible pumping chamber having an inlet and an outlet; an inlet check valve and an outlet check valve controlling said inlet and said outlet, respectively; means operable by fluid pressure for loading said outlet check valve independently of the discharge from said outlet; conduit means for communicating to said fluid pressure means the pressure of the source of the pressurized liquid being pumped; and means on a movable wall of said chamber engageable with said outlet check valve on inward over-travel of said wall to positively open said outlet check valve to purge said chamber of gas prior to metering liquid.

2. A pump for accurately metering a pressurized normally-gaseous liquid comprising: means defining an expansible pumping chamber having an inlet and an outlet, said outlet being in a fixed wall of said chamber; an inlet check valve and an outlet check valve controlling said inlet and said outlet, respectively; means operable by fluid pressure for loading said outlet check valve independently of the discharge from said outlet; conduit means for communicating to said fluid pressure means the pressure of the source of the pressurized liquid being pumped; and interengageable means on said outlet check valve and a movable wall of said chamber for positively unseating said outlet check valve to purge said chamber of gas upon inward over-travel of said movable wall.

3. A pump for accurately metering a pressurized normally-gaseous liquid comprising: a pumping cylinder having an inlet and an outlet, said outlet being in an end wall of said cylinder; an inlet check valve and an outlet check valve controlling said inlet and outlet, respectively; means operably associated with said outlet check valve for loading the latter with the fluid pressure of the source of the liquid to be pumped independently of the discharge from said outlet; a piston reciprocable in said cylinder; rotary means operatively associated with said piston for periodically pushing the latter a predetermined extent into said cylinder toward said end wall; interengageable means on said piston and on said outlet check valve for positively unseating the latter upon inward over-travel of the former beyond said predetermined extent to purge said cylinder of gas prior to metering liquid; and manually operable means for effecting said over-travel.

4. A pump for metering a pressurized normally gaseous liquid comprising: means defining an expansible pumping chamber provided with a movable wall and an inlet and an outlet; an inlet valve controlling said inlet; an outlet valve controlling said outlet and being mounted in a fixed wall of said pumping chamber; means operatively associated with said outlet valve for loading the latter with fluid pressure from the source of the liquid being pumped independently of the discharge from said outlet; rotary means operatively associated with said movable wall for periodically pushing the latter a predetermined extent into said chamber; manually-operable means operatively associated with said movable wall for effecting inward over-travel of the latter beyond said predetermined extent; and interengageable means on said outlet valve and said movable wall for positively unseating said outlet valve to purge said chamber of gas upon said inward over-travel.

5. A pump for metering a pressurized normally-gaseous liquid comprising: a pumping cylinder provided with an inlet and an outlet; an inlet valve controlling said inlet; an outlet check valve controlling said outlet; means operatively associated with said outlet valve for loading the latter with the fluid pressure of the source of the pumped liquid independently of the discharge from said outlet; a pumping plunger reciprocable in said cylinder; rotary means operatively associated with said plunger for effecting inward movement thereof a predetermined extent; adjustable means operatively associated with said plunger for limiting outward movement thereof; manually operable lever means constituting a part of said adjustable means for effecting inward over-travel of said plunger; and abutment means on said outlet valve and on said plunger engageable upon inward over-travel of the latter beyond said predetermined extent for unseating said outlet check valve to purge said cylinder of gas prior to a metering operation of said pump.

References Cited in the file of this patent

UNITED STATES PATENTS

| Number | Name | Date |
|---|---|---|
| 67,666 | Merrill et al. | Aug. 13, 1867 |
| 140,016 | Coleman | June 17, 1873 |
| 156,279 | Clark | Oct. 27, 1874 |
| 855,050 | Dietrich | May 28, 1907 |
| 1,170,756 | Kelley | Feb. 8, 1916 |
| 1,486,498 | Smith | Mar. 11, 1924 |
| 1,922,721 | Weichart | Aug. 15, 1933 |
| 1,923,395 | Reed | Aug. 22, 1933 |
| 2,430,545 | Wesley | Nov. 11, 1947 |
| 2,481,183 | Welby | Sept. 6, 1949 |
| 2,657,640 | Arant | Nov. 3, 1953 |

FOREIGN PATENTS

| Number | Country | Date |
|---|---|---|
| 274,991 | Italy | Jan. 9, 1930 |